United States Patent [19]
Yamamoto et al.

[11] Patent Number: 6,021,517
[45] Date of Patent: Feb. 1, 2000

[54] STORAGE DEVICE AND STORAGE SUBSYSTEM FOR EFFICIENTLY WRITING ERROR CORRECTING CODE

[75] Inventors: Yasutomo Yamamoto; Akira Yamamoto, both of Sagamihara, Japan

[73] Assignee: Hitachi, Ltd., Tokyo, Japan

[21] Appl. No.: 09/034,017

[22] Filed: Mar. 2, 1998

[30] Foreign Application Priority Data

Mar. 14, 1997 [JP] Japan .................................. 9-060510

[51] Int. Cl.$^7$ .................................................. G11C 29/00
[52] U.S. Cl. ......................... 714/763; 714/768; 714/769; 714/770
[58] Field of Search .................... 714/5, 6, 761, 714/762, 763, 764, 765–773; 369/93, 94, 99

[56] References Cited

U.S. PATENT DOCUMENTS

| | | | |
|---|---|---|---|
| 5,452,429 | 9/1995 | Fuoco et al. ................................. | 714/6 |
| 5,568,467 | 10/1996 | Inagaki et al. ........................ | 369/275.3 |
| 5,768,298 | 6/1998 | Nagai et al. ............................. | 714/769 |
| 5,790,491 | 8/1998 | Jauette et al. .............................. | 369/54 |
| 5,815,482 | 9/1998 | Rope et al. .............................. | 369/112 |

*Primary Examiner*—Emmanuel L. Moise
*Attorney, Agent, or Firm*—Antonelli, Terry, Stout & Kraus, LLP

[57] ABSTRACT

In the event that during write to a storage device such as a DVD, data does not fill up a unit of generation of an error correction code (ECC), an increase in the data transfer amount caused by reading a shortage of data from a storage medium can be prevented. Controlling is carried out such that write data is not immediately written to the storage medium but write operation is deferred until an amount of data of ECC generation unit is complete in a buffer memory. As a result, the ECC can be generated and written to the storage medium by using only the write data without resort to read of the shortage of data from the storage medium.

9 Claims, 10 Drawing Sheets

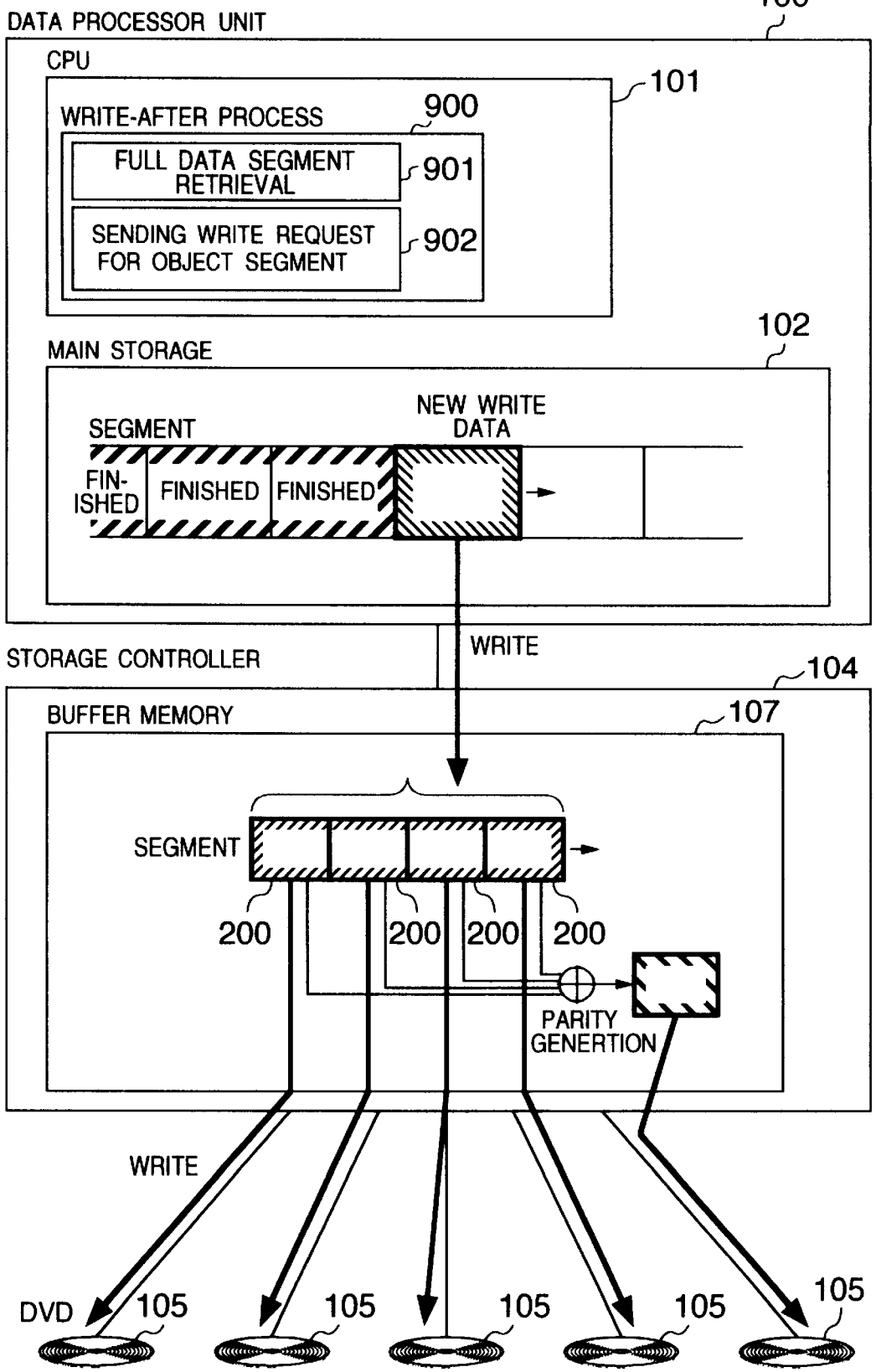

STORAGE DEVICE AND STORAGE SUBSYSTEM FOR EFFICIENTLY WRITING ERROR CORRECTING CODE

BACKGROUND OF THE INVENTION

The present invention relates to a storage device and a storage subsystem comprised of the storage device and a storage controller.

In addition to a disk device, a magnetic tape or an optical storage device is often used as a storage device in a computer system. Recently, a digital video disk (DVD) has particularly been highlighted.

The DVD is a storage medium suitable for storing data of a large scale such as a voice, an image or a moving picture. As the need for processing large scale data in multi-media increases, realization of increasing performance,increasing reliability and increasing availability is much thought of.

A literature "A Case for Redundant Arrays of Inexpensive Disks (RAID)" by D. Patterson et al, ACM SIGMOD conference proceeding, Chicago, Ill., Jun. 1–3, 1988, pp. 109–116 discloses a technique for data arrangement on a disk array.

The disk array is a mechanism for realization of increasing performance and increasing reliability in a disk system. In the disk array, to meet increasing performance, disk devices which are physically plural in number impersonate a single disk device for a processor unit. On the other hand, to meet increasing reliability, check information or redundant data for recovering data in the event that a disk device storing the data becomes faulty is stored in a different disk device.

Usually, data behaving as a read/write unit in the disk device is called a record and in the literature by Patterson, some methods for record arrangement are proposed. In the case where the disk array is used, however, a data length of a record representing a read/write unit as viewed from the processor unit sometimes differs from a data length of a record which is actually recorded in the disk device. Hereinafter, the former will be called a logical record and the latter will be called a physical record.

In the storage disk such as disk device, an error correcting code (ECC) serving as a code for error correction is added every constant recording unit when data is stored in a storage medium, thereby improving the reliability. For example, in a disk device of small computer system interface (SCSI), ECC's are generated and added to data at intervals of individual data pieces of 512 bytes and in the DVD, they are generated and added to data at intervals of individual data pieces of 32 Kbytes.

Accordingly, when data of desired size written by the data processor unit is written into the storage medium, an amount of data by which the written data is short of the ECC generation unit must once be read from the storage medium to a buffer, the read-out data must be combined with the write data to permit an ECC to be generated, and the combined data and the ECC must be written to the storage medium. Consequently, a long time is required for the write processing.

A similar problem arises in an instance where the technique of redundant arrays of inexpensive disk (RAID) is applied to storage devices.

In the RAID, consecutive data written by the data processor unit is divided into a plurality of physical records, which are stored in corresponding storage media. These physical records to be stored will hereinafter be called data records. Then, check information pieces or redundant data pieces are generated in association with the plurality of data records and a check information piece is stored in a physical record of a different storage medium. Hereinafter, the check information is called a parity, the physical record for storing the parity is called a parity record and a gang of the parity record and some corresponding data records is called a parity group.

In the RAID, too, when the data record and the parity record are to be stored in the corresponding storage media, ECC's are generated and added. At that time, if the physical record does not neatly fill up the ECC generation unit, a shortage of data must be read out of the storage medium. For example, on the assumption that the physical data size is 80 Kbytes in the case of a DVD having an ECC generation unit of 32 Kbytes, ECC's can be generated for initial 64 Kbytes by using only write data but for the remaining 16 Kbytes, data or parity of 16 Kbytes corresponding to a shortage must be read out of the storage medium.

As will be seen from the above, in operation of write to the storage device such as DVD, data or parity short of the ECC generation unit must be read out of the storage medium and consequently, data which is essentially superfluous must be transferred. Disadvantageously, this degrades the performance of the whole of the storage subsystem when the load on the storage device increases.

SUMMARY OF THE INVENTION

An object of the present invention is to increase the performance of the processing of write to a storage device in which ECC's are generated.

According to the present invention, to accomplish the above object, in the processing of write to a storage device in which an ECC is generated for data of a predetermined unit during data storage, data written by a data processor unit is not immediately written to a storage medium but write to the storage medium is deferred until data of an ECC generation unit becomes complete in the form of write data. As a result, an ECC can be generated and written to the storage medium by using only write data without reading a shortage of data from the storage medium.

Especially, in the case of consecutive data of a large scale handled by a DVD, the probability that write data transmitted from the data processor unit is followed by consecutive data which is consecutively written and with the above data schedule, almost all data pieces can be written to storage media without resort to superfluous read operation of data.

Controlling write operation such that the write operation is deferred until data of the ECC generation unit becomes complete or filled up may be effected by the data processor unit or the storage device without using the storage controller.

Similarly, in the RAID, by making the physical record size a multiple of the ECC generation unit, ECC's can be generated for data records for which generation of a parity is complete and for a parity record by using only data on the buffer and can be written to the storage device.

As described above, according to the present invention, the amount of data to be transferred during data write operation can be decreased and increasing performance can be ensured in the storage device such as DVD and in the storage subsystem in which the RAID technique is applied to the storage device such as DVD.

BRIEF DESCRIPTION OF THE DRAWINGS

FIG. 11 is a block diagram showing the operation of the storage subsystem in a modification of the second embodiment of the present invention in which the write-after process is carried out by the data processor unit.

DESCRIPTION OF THE PREFERRED EMBODIMENTS

The present invention will now be described by way of example with reference to the accompanying drawings.

The description will be given to two embodiments of the present invention or first and second embodiments.

In the first embodiment, the storage device is exemplified by a DVD, write data to the DVD is temporarily stored in the buffer and after an amount of write data of 32 Kbytes representing an ECC generation unit is complete or filled up, an ECC is generated and the write data together with the ECC is written into the storage medium.

In the second embodiment, in a DVD-RAID in which the RAID technique is applied to the DVD, the physical record size is made to be a multiple of 32 Kbytes representing the ECC generation unit, write data is stored in the buffer and after amounts of data for all data records of a parity group are complete, a parity is generated, ECC's are generated for each data record and a parity record, respectively, and the ECC's, data record and parity record are written into the storage media.

(1) First Embodiment

Referring first to FIGS. 1 to 5 and FIGS. 9 and 10, the first embodiment will be described.

Figure 1:
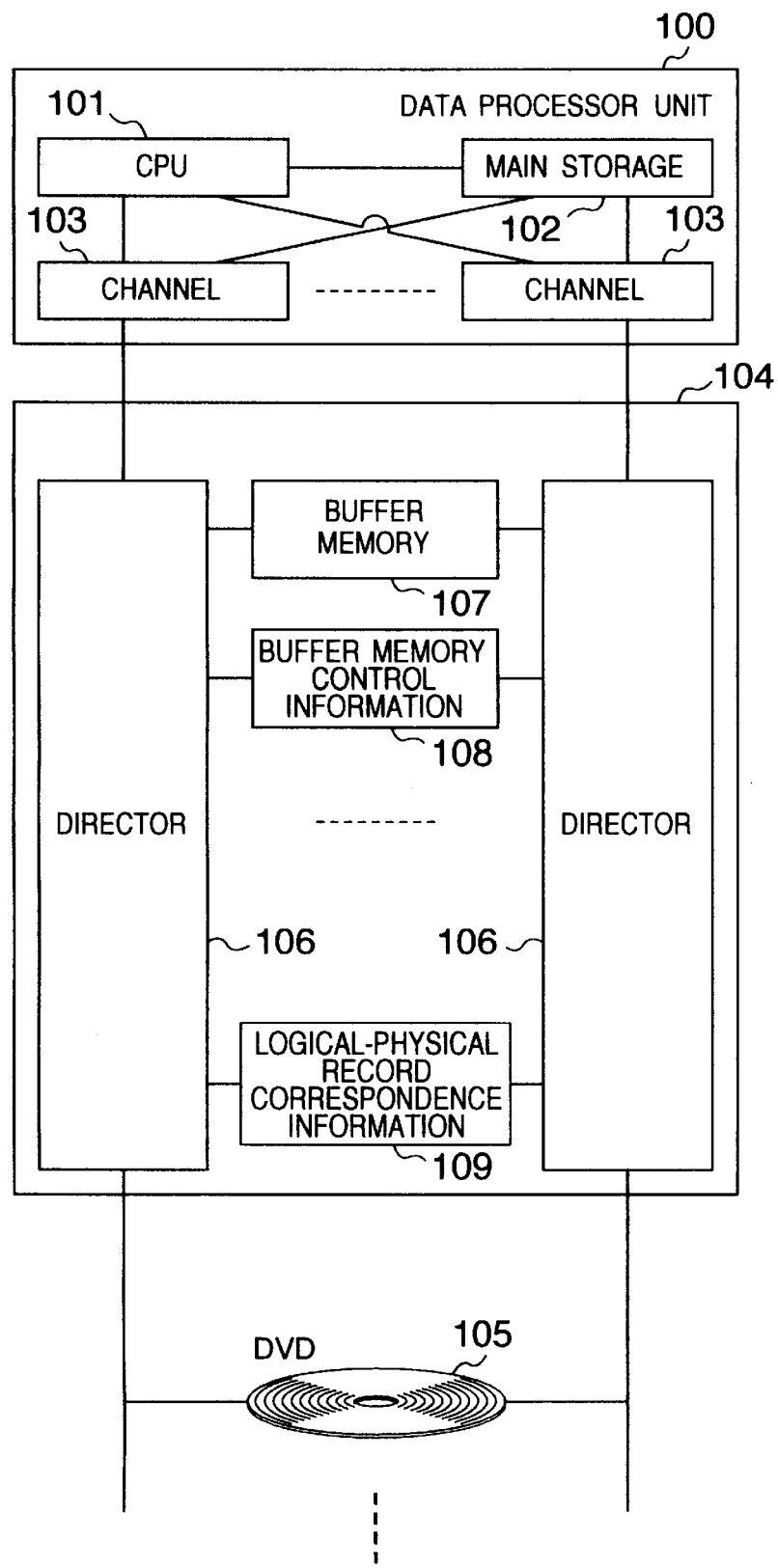
FIG. 1 is a block diagram of an information processing system to which the present invention is applied.

An information processing system to which the present invention is applied is shown, in block form, in FIG. 1.

The information processing system comprises a data processor unit 100, a storage controller 104 and one or more DVD's 105 which are interconnected to each other.

The data processing unit 100 includes a CPU 101, a main storage 102 and channels 103.

The storage controller 104 includes one or more directors 106, a buffer memory 107, buffer memory control information 108 and logical-physical record correspondence information 109.

The director 106 is adapted to perform data transmission between the channel 103 and the buffer memory 107 as well as between the buffer memory 107 and the DVD 105.

Figure 2:
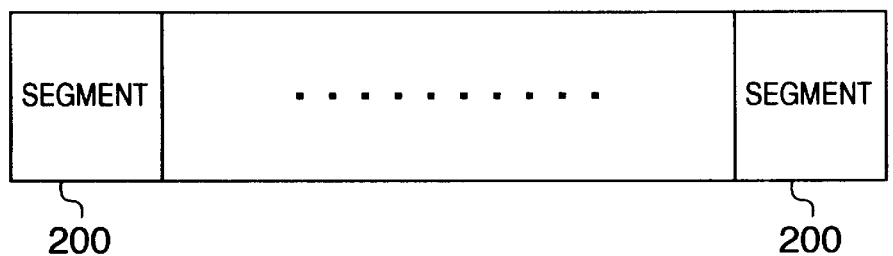
FIG. 2 is a diagram showing the construction of a buffer memory.

The buffer memory 107 temporarily stores write data to the DVD 105. Writing of the stored write data to the DVD 105 is executed by the director 106. FIG. 2 shows the construction of the buffer memory 107. The buffer memory 107 is comprised of a plurality of segments 200. In the case of the first embodiment, the size of one segment is 32 Kbytes representing an ECC generation unit of the DVD. In the DVD-RAID of the second embodiment, the size of one segment 200 has a value which can store data of a physical record. In the second embodiment, the physical record size is a multiple of 32 Kbytes representing the ECC generation unit and therefore, the size of one segment conforms thereto. It can be determined by using a conventional known method which data area or record is assigned to which segment 200. A vacant segment or segments 200 to which no data area or record is assigned can also exist.

Figure 3:
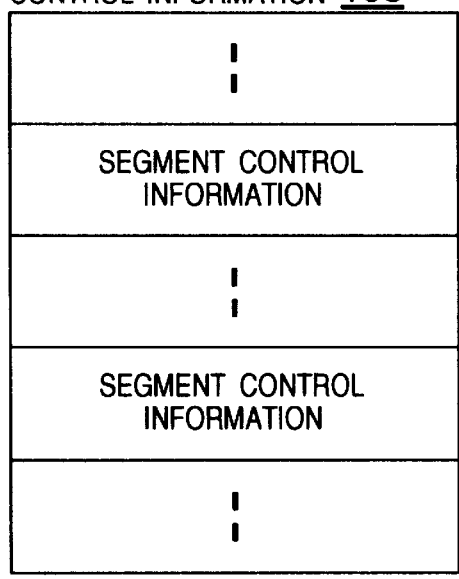
FIG. 3 is a diagram showing the construction of a part of buffer memory control information which has relation to the present invention.

The buffer memory control information 108 stores information concerning the individual segments 200 of the buffer memory 107. FIG. 3 shows the construction of a part of the buffer memory control information 108 having relation to the present embodiment. The buffer memory control information is comprised of segment control information pieces 300 for controlling states of the individual segments 200. The existent segment control information pieces 300 equal in number to the segments 200 but do not have static one-to-one correspondence to the segments 200.

The segment control information 300 is comprised of assignment data position information 301, final write time 302, storage data start position 303 and storage data size 304. The assignment data position information 301 indicates a data area or a physical record to which a segment 200 is assigned. The final write time 302 indicates a time that write data stored in a segment 200 is lastly accessed by the data processor unit 100. The storage data start position 303 indicates a relative start position, within the data area or physical record, of write data pieces actually stored in this segment, and the storage data size 304 indicates the size.

The logical-physical record correspondence information 109 controls the correspondence relation between a logical record and a physical record and when accessed by the data processor unit 100, it is used to calculate a physical record for storing access data and a relative position in the physical record. Controlling of the logical-physical record correspondence relation by the logical-physical record correspondence information 109 can be carried out using a conventional known method.

Next, the operation of the storage controller 104 in the first embodiment will be described.

The present embodiment handles the write processing in a storage subsystem comprised of a single DVD 105.

Figure 4:
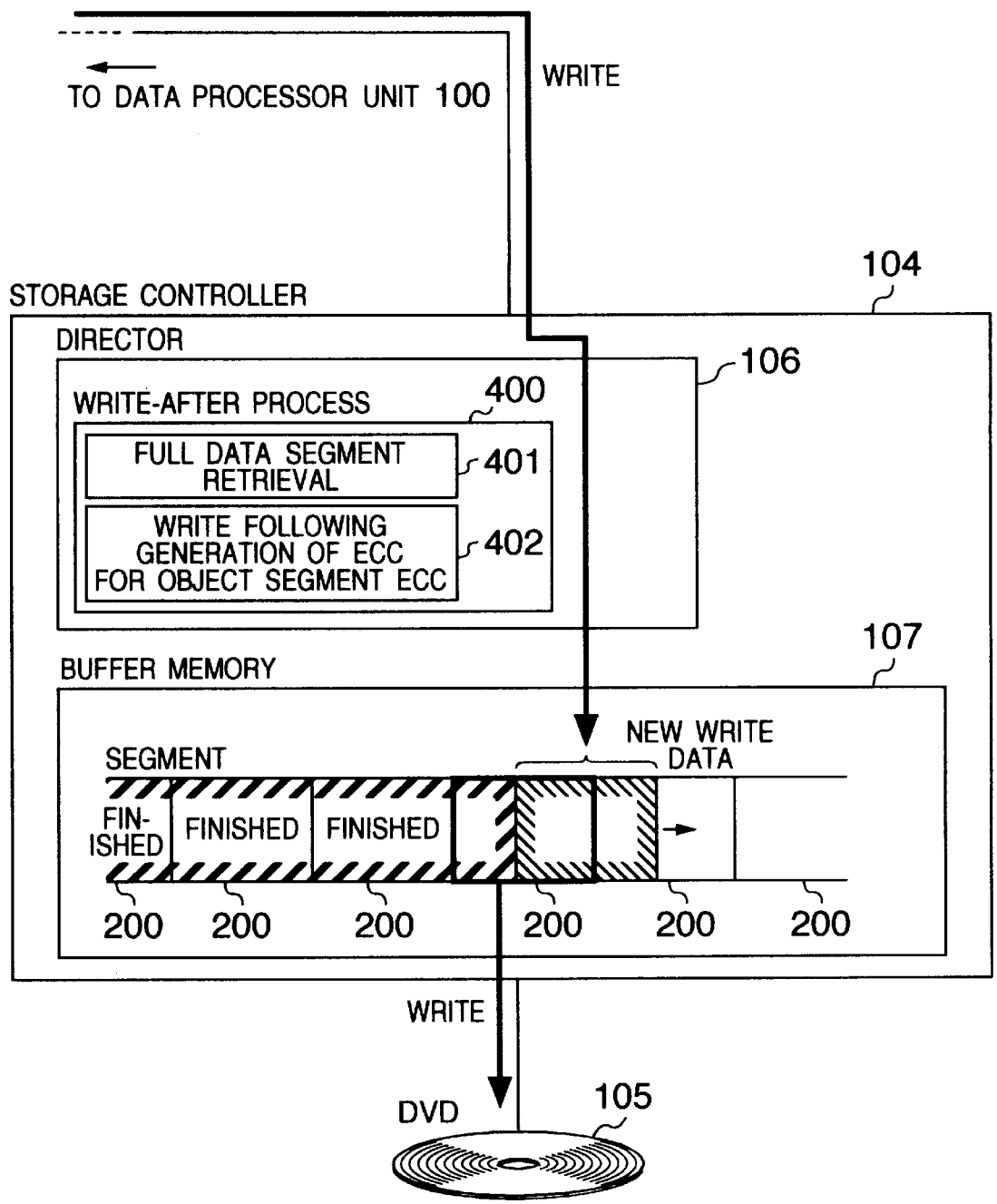
FIG. 4 is a block diagram showing the operation of a controller in a first embodiment of the present invention.

FIG. 4 is a diagram showing details of the operation of the storage controller in the present embodiment.

Firstly, a segment 200 is assigned to data written by the data processor unit 100 and the data is accumulated in the buffer memory 107. The segment 200 accumulated with the data is examined as to an amount of accumulated data and a time elapsed from the time that the data is lastly written. If there exists a segment 200 storing all data pieces of 32 kbytes or a segment 200 storing data for which a prescribed time or more has elapsed from the time that the data is written, the data stored in that segment 200 is written to the DVD 105. This process is called a write-after process.

Since a conventional known method can be applied to the assignment of the segment 200 to the write data from the data processor unit 100 and the storage of the segment, only the write-after process will be described.

In the write-after process, the segment stored with the write data is periodically retrieved to retrieve an object segment to be processed (401), and the data stored in the segment 200 is written to the DVD 105 (402).

Figure 5:
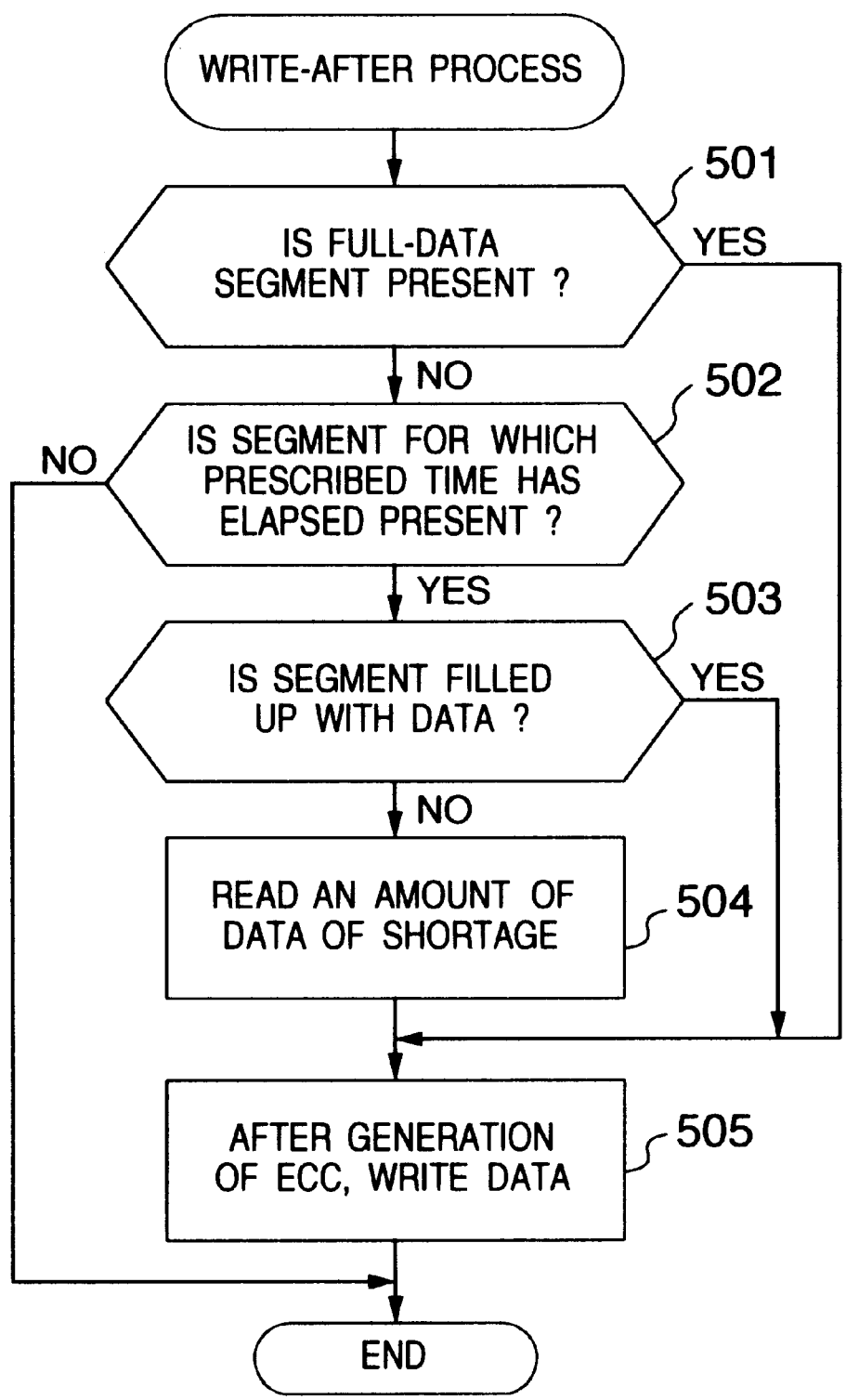
FIG. 5 is a flow chart of a write-after process in the first embodiment.

FIG. 5 is a flow chart of the write-after process.

In step 501, by using control information 108 for a segment 200 on buffer memory 107 which stores write data, a segment 200 which stores all data pieces of 32 Kbytes is retrieved. If the segment 200 in which all data pieces are complete is present, this segment is used as an object segment to be processed and the program jumps to step 505. If not present, the program proceeds to step 502.

In the step 502, a segment 200 for which a prescribed time or more has elapsed from the time that data is written is retrieved from segments 200 which store write data not satisfying the condition in the step 501, by using the control information 108. If a segment 200 for which the prescribed time has elapsed is present, this segment is used as an object segment to be processed and the program proceeds to step 503. If not present, the write-after process is interrupted.

In the step 503, an amount of the write data stored in the segment 200 used as the object segment to be processed in the step 502 is consulted by the control information 108 for that segment 200 to decide whether all data pieces of 32 Kbytes are stored in the object segment 200. If all data pieces are stored, the program jumps to the step 505 but if the data stored in the segment 200 has a shortage, a range of the shortage is determined and then the program proceeds to step 504.

In the step 504, an amount of data for filling up 32 Kbytes is read from the DVD 105 to the buffer memory 107 to complete data necessary for ECC preparation.

In the step 505, an ECC is generated for write data which completes 32 Kbytes, the generated ECC is added to the write data and the combined data is written into the DVD 105.

Figure 9:
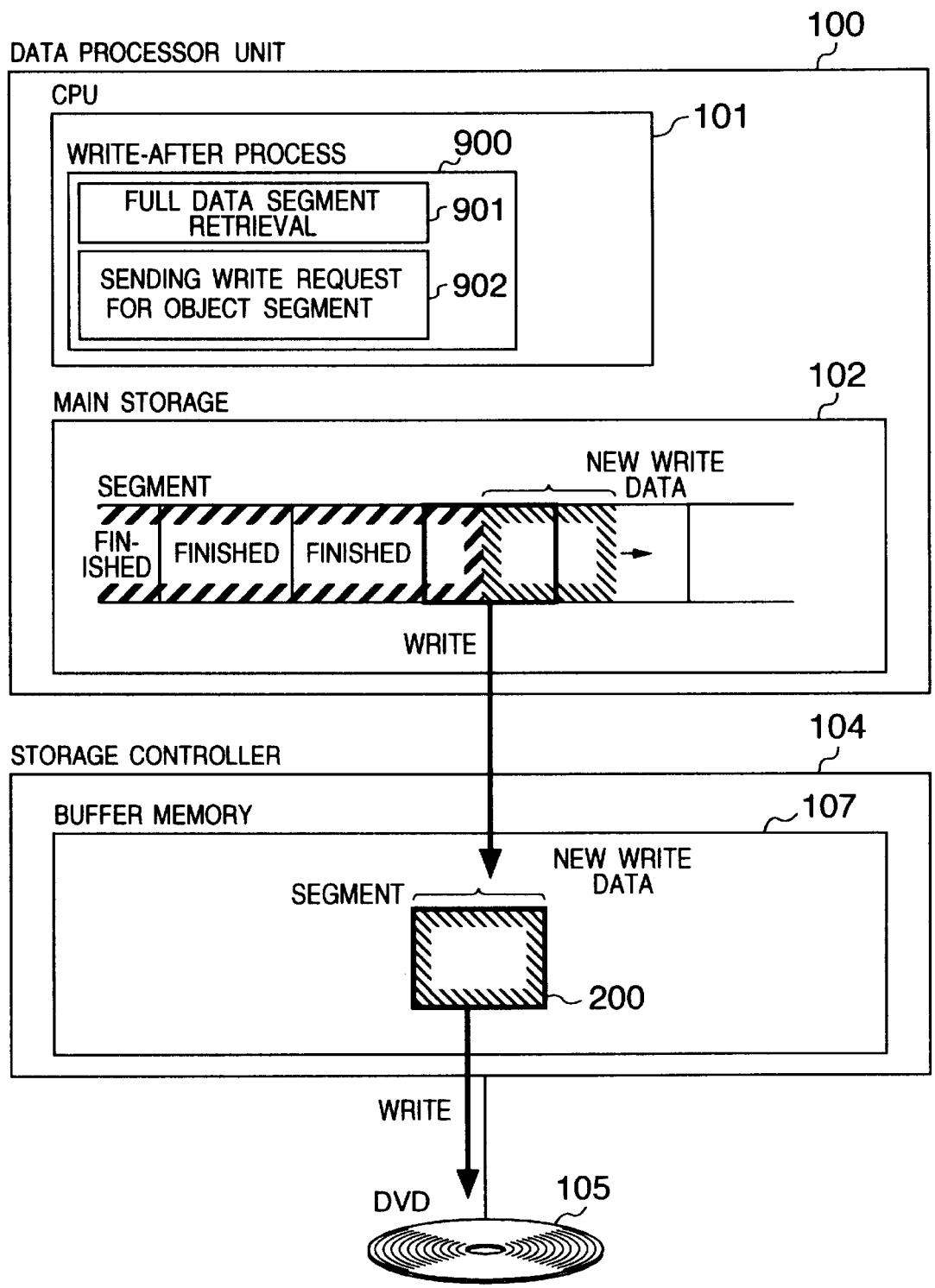
FIG. 9 is a block diagram showing the operation of the storage subsystem in a modification of the first embodiment of the present invention in which the write-after process is carried out by the data processor unit.
Figure 10:
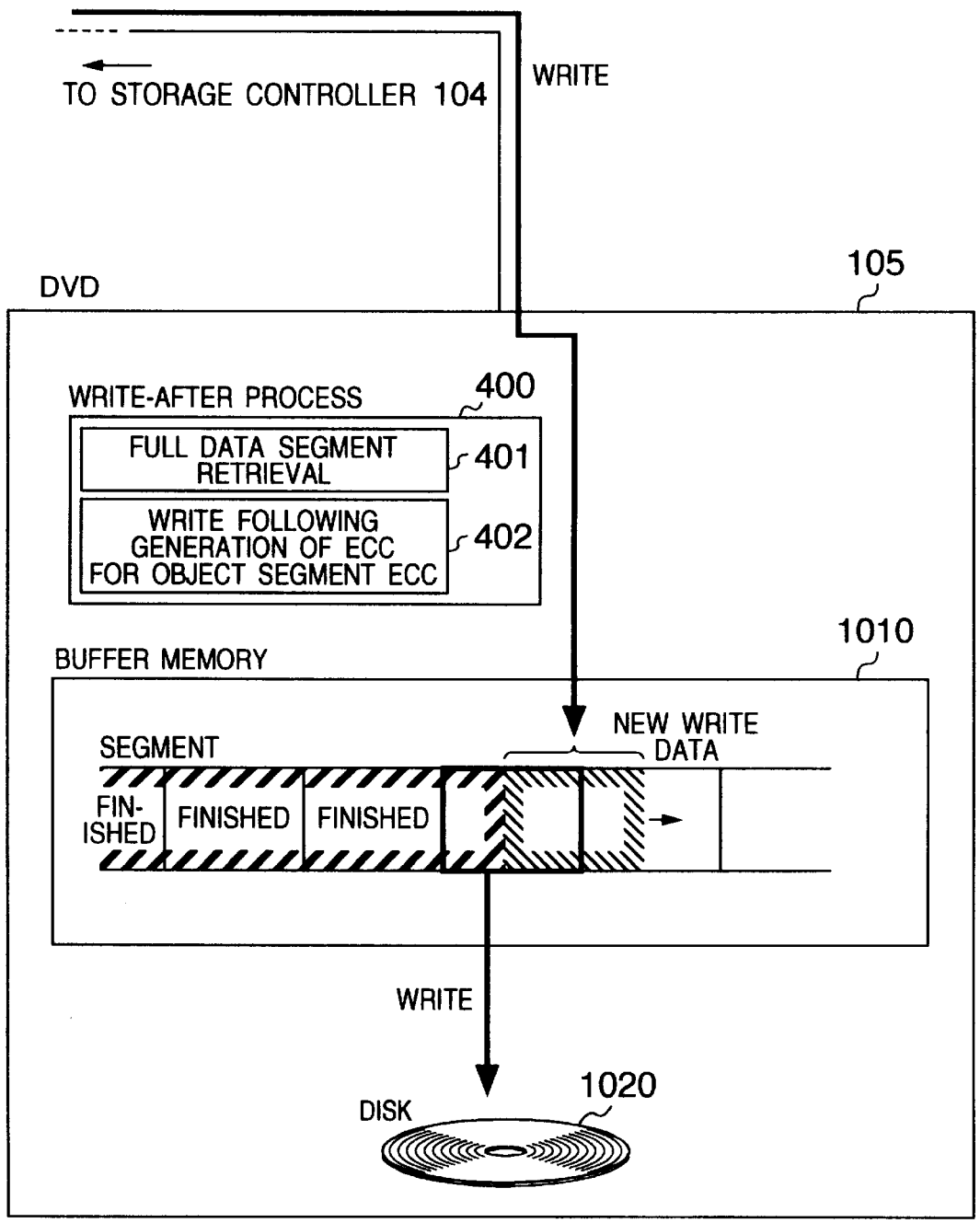
FIG. 10 is a block diagram showing the operation of the storage subsystem in another modification of the first embodiment of the present invention in which the write-after process is carried out by the DVD.

In the present embodiment, controlling of deferring write operation until the amount of data for the ECC generation unit is complete is effected by the storage controller 104 but this write-after process may alternatively be effected by the data processor unit 100 or the DVD 105. FIG. 9 shows the operation of the storage subsystem when the write-after process is carried out by the data processor unit 100 and FIG. 10 shows the operation of the storage subsystem when the write-after process is carried out by the DVD 105. In either case, write data is held in the main storage 102 or the buffer memory of the unit so that after the amount of data for the ECC generation unit is filled up, the write process may be executed. The flow of the write-after process is the same as that shown in FIG. 5 and will not be described.

(2) Second Embodiment

The second embodiment will now be described with reference to FIGS. 6 to 8 and FIG. 11.

The present embodiment is directed to a write process in the DVD-RAID.

Figure 6:
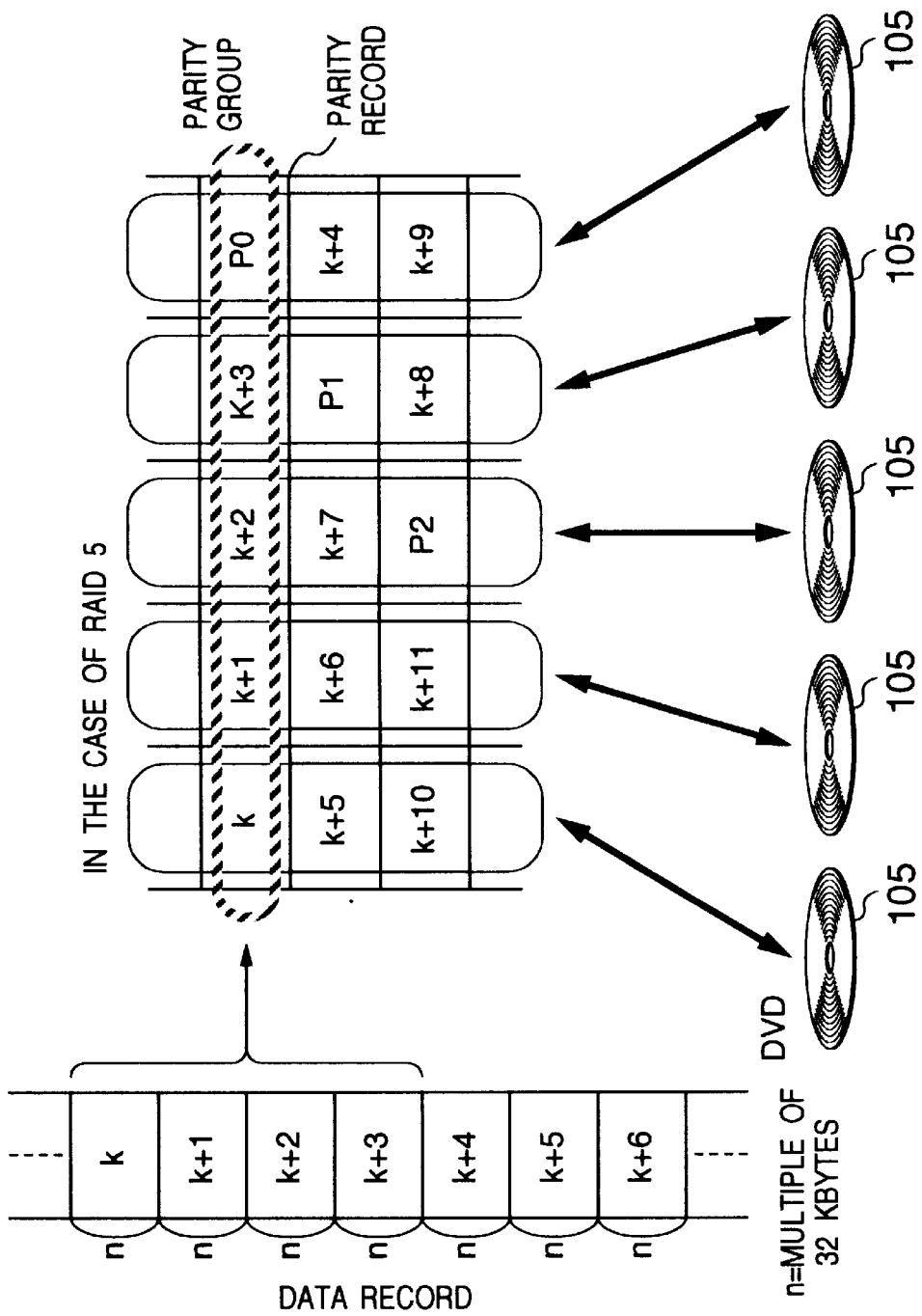
FIG. 6 is a diagram showing the correspondence between data written by a data processor unit and data records in a second embodiment of the present invention.

FIG. 6 shows the correspondence of data from the data processor unit 100 to data records in the present embodiment. In the present embodiment, the physical record size is set to a multiple n of 32 Kbytes representing the ECC generation unit of the DVD 105 and data from the data processor unit 100 is divided by this size n. On the assumption that the RAID level of DVD-RAID is RAID 5 in the present embodiment, a parity is generated for physical records in a unit of parity group and the physical records and the parity are stored in individual DVD's 105 as shown in FIG. 6.

Figure 7:
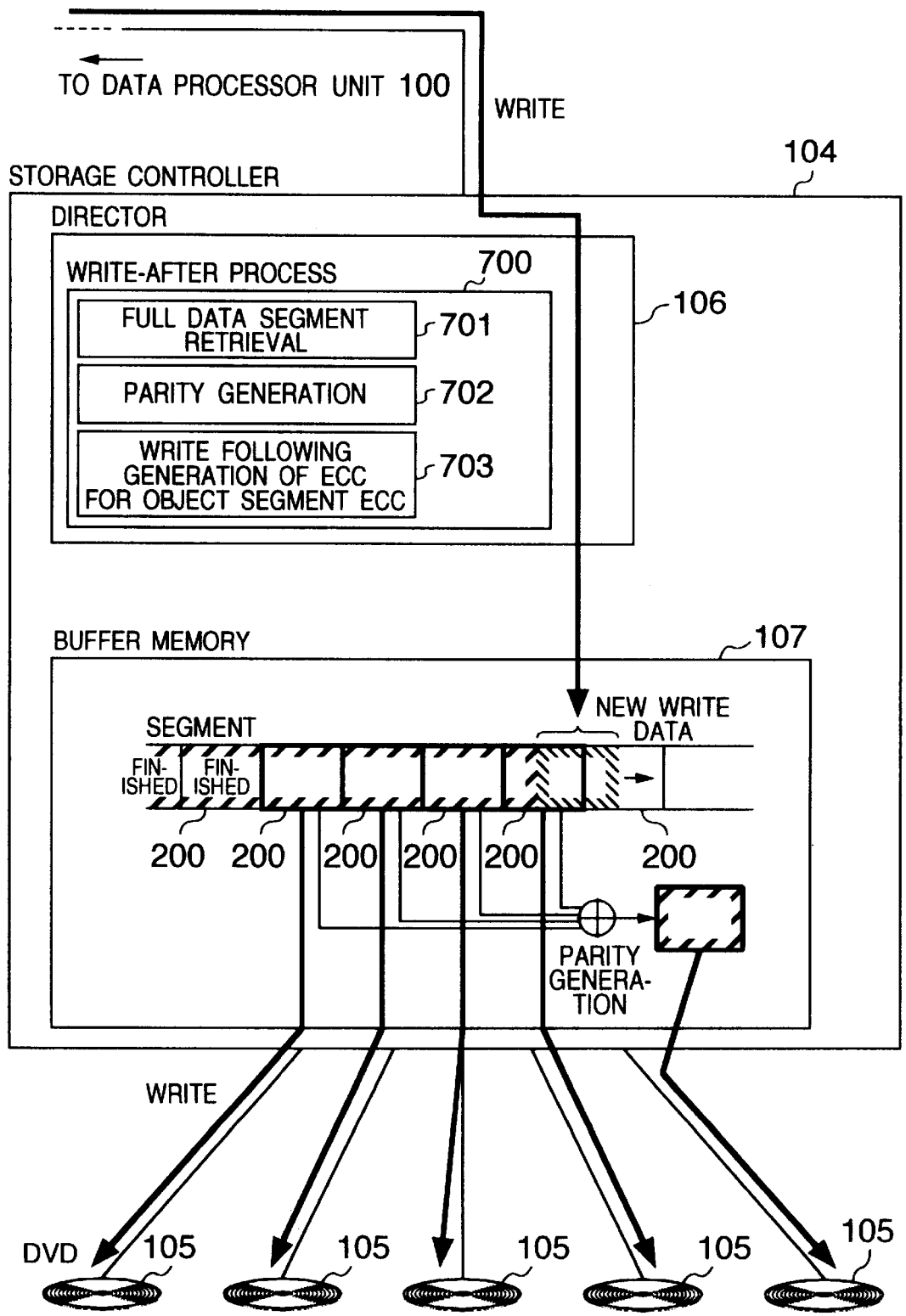
FIG. 7 is a block diagram showing the operation of a controller in the second embodiment.

FIG. 7 is a diagram indicating details of the operation of the storage device in the present embodiment.

Data records corresponding to data written by the data processor unit 100 are calculated, assigned with a segment 200 and accumulated on the buffer memory 107. The accumulated records are checked as to whether data is complete for the same parity group or whether the prescribed time or more has elapsed following write. If the data is complete or the prescribed time has expired, a parity is generated for the data records of that parity group, ECC's are generated for the data and parity, the data and an ECC are put together so as to be written into a DVD 105 and the parity and an ECC are put together so as to be written into a different DVD 105. This process is called a write-after process as in the case of the first embodiment.

In the write-after process, a segment 200 storing write data is periodically retrieved to retrieve a parity group representing an object to be processed (701) and after a parity is generated (702), the data and parity are written in the DVD's 105 (703).

Figure 8:
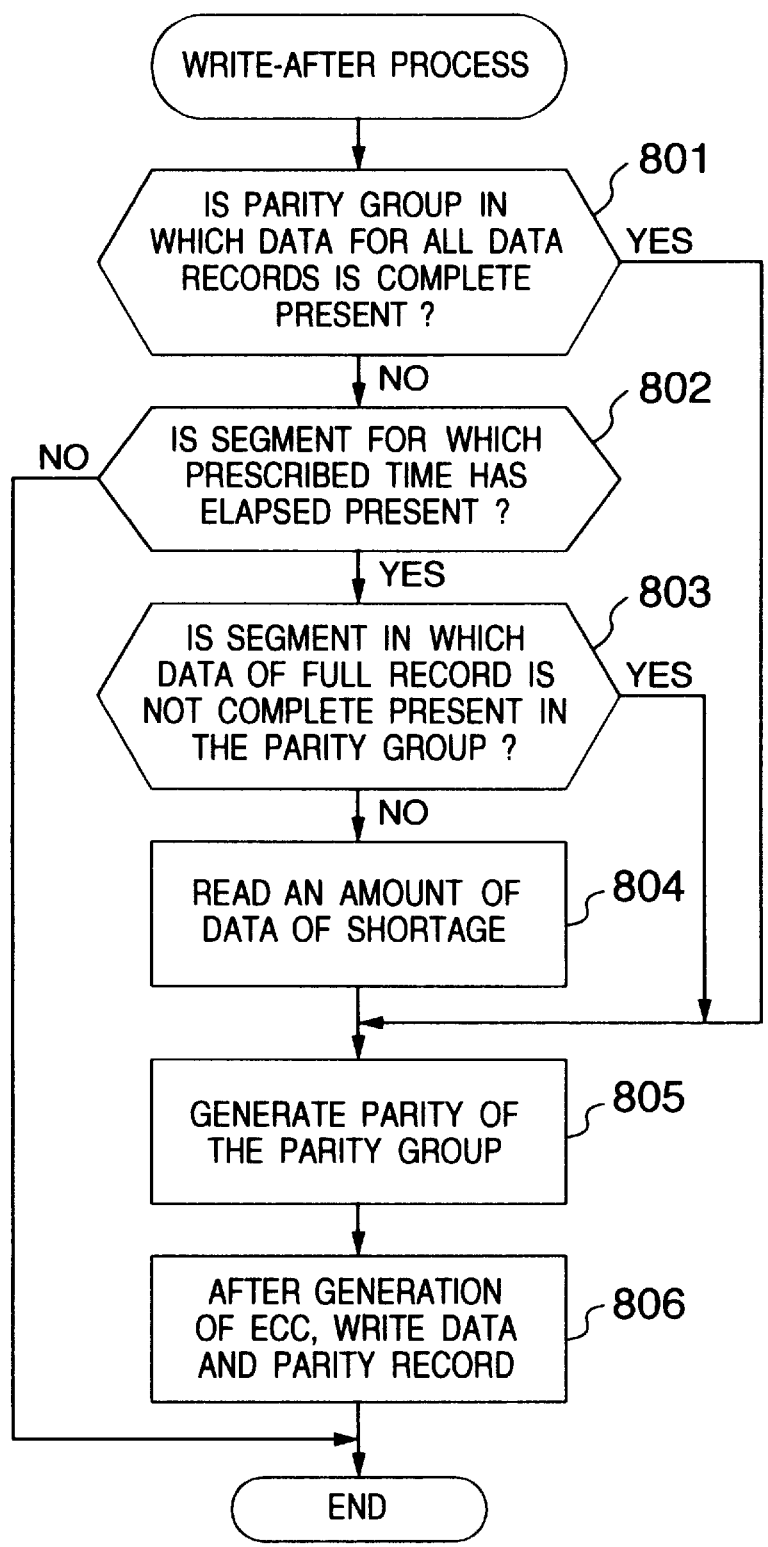
FIG. 8 is a flow chart of a write-after process in the second embodiment.

FIG. 8 is a flow chart of the write-after process.

In step 801, a parity group in which all data pieces of data records belonging to the parity group are stored in segments 200 is retrieved by using control information 108 for a segment 200 on buffer memory 107 which stores write data. If a parity group satisfying the condition is present, this group is used as an object to be processed and the program jumps to step 805. If not present, the program proceeds to step 802.

In the step 802, a segment 200 for which the prescribed time or more has elapsed following write is retrieved from segments 200 storing write data by using the control information 108. If a corresponding segment 200 is present, a parity group to which a data record assigned with this segment 200 belongs is handled as an object to be processed and the program proceeds to step 803. If not present, the write-after process is interrupted.

In the step 803, the segments 200 of individual data records belonging to the parity group handled as the process object in the step 802 are examined and the presence or absence of a segment 200 in which data of full record is not complete is checked. If a corresponding segment 200 is not present, the program jumps to step 806 but if present, a range of a shortage of data is determined and the program proceeds to step 804.

In the step 804, for a segment 200 which is short of data, a shortage of data is read out of the DVD 105 and data necessary for ECC preparation is completed on the buffer memory 107.

In the step 805, data records of the parity group of interest are exclusive-ORed to generate a parity.

In the step 806, ECC's are generated for the data records and the parity record of the corresponding parity group and the data records, the parity record and ECC's are written to the DVD's 105.

In the present embodiment, such control that write operation is deferred until data of the physical record size which is a multiple of the ECC generation unit is complete is carried out by the storage controller 104 but this write-after process may alternatively be carried out by the data processor unit 100 as shown in FIG. 11.

According to the storage control method and storage controller of the present invention, when write data is written from the data processor unit to the storage device such as DVD, the ECC can be generated by only the write data and the write data and ECC in combination can be written to the storage medium, thus ensuring that increasing performance of the storage subsystem as a whole can be realized.

Further, when data records provided with a parity and a parity record are written to storage media, respectively, in the storage subsystem in which the RAID technique is applied to the storage device such as DVD, ECC's can be generated by using only write data and increasing performance of the storage subsystem as a whole can be realized.

We claim:

1. A method of controlling a storage controller which is connected to a data processor unit and a storage device and which generates an error correction code in a unit of a predetermined amount of write data in accordance with a write request from said data processor unit and writes the error correction code to said storage device, comprising the steps of:

when write data which does not fill up said predetermined amount arises in accordance with a first write request from said data processor unit, deferring write of said write data to said storage device;

at the time that following the deferment, the write data reaches said predetermined amount in accordance with a second write request from said data processor unit, generating said error correction code for said write data of said predetermined amount; and writing said write data of said predetermined amount and said generated error correction code to said storage device.

2. A storage controller controlling method according to claim 1, wherein said storage device is a digital video disk and said predetermined amount is 32 Kbytes.

3. A method of controlling a storage controller which is connected to a data processor unit and a storage device and which generates an error correction code in a unit of a predetermined amount of write data in accordance with a write request from said data processor unit and writes the error correction code to said storage device, comprising the steps of:

when write data which does not fill up said predetermined amount arises in accordance with a first write request from said data processor unit, deferring write of said write data to said storage device;

at the time that following the deferment, a predetermined time has elapsed, deciding whether the write data reaches said predetermined amount, whereby (a) if said write data reaches said predetermined amount in accordance with a second request from said data processor unit, said error correction code is generated for said write data of said predetermined amount, and (b) if said write data does not reach said predetermined amount, data corresponding to a difference between said predetermined amount and said write data is read from said storage device; and generating said error correction code for the read data and said write data.

4. A method of controlling a storage controller connected to a data processor unit and (n+1) storage devices, in which write data are divided into units of a predetermined first amount and a parity is generated by n units of write data, to generate an error correction code in a unit of a predetermined second amount of write data and parity, comprising the steps of:

when write data which does not fill up an n multiple of said first amount arises in accordance with a first write request from said data processor unit, deferring write of said write data to said (n+1) storage devices;

at the time that following the deferment, the write data reaches the n multiple of said first amount in accordance with a second request from said data processor unit, generating a parity data for the write data of the n multiple of said first amount;

generating error correction codes for said write data of the n multiple of said first amount and said generated parity data; and writing said write data of the n multiple of said first amount, said generated parity data and said error correction codes to predetermined said (n+1) storage devices.

5. A storage controller controlling method according to claim 4, wherein each of said (n+1) storage devices is a digital video disk and said first amount is 32 Kbytes.

6. A method of controlling a storage controller which is connected to a data processor unit and (n+1) storage devices, in which write data are divided into units of a predetermined first amount and a parity is generated by n units of write data, and which generates an error correction code in unit of a predetermined second amount of write data and parity, comprising the steps of:

when write data which does not fill up an n multiple of said first amount arises in accordance with a first write request from said data processor unit, deferring write of said write data to said (n+1) storage devices;

at the time that following the deferment, a predetermined time has elapsed, deciding whether the write data reaches the n multiple of said first amount, whereby if the write data does not reach the n multiple of said first amount, data corresponding to a difference between the n multiple of said first amount and said write data is read from said storage device;

generating parity data for read data and said write data; and generating error correction codes for said read data, said write data and the generated parity data.

7. A method of controlling a storage device which generates an error correction code in a unit of a predetermined amount of write data and writes the error correction code, comprising the steps of:

when write data which does not fill up said predetermined amount arises in accordance with a first write request, deferring write of said write data to said storage device;

at the time that following the deferment, the write data reaches said predetermined amount in accordance with a second write request, generating said error correction code for said write data of said predetermined amount; and writing s aid write data of said predetermined amount and said error correction code to said storage device.

8. A method of controlling a computer system having a storage device, a storage controller which is connected to said storage device and which generates an error correction code in a unit of a predetermined amount of write data and writes the error correction code to said storage device and a data processor unit connected to said storage controller, comprising the steps of:

while write data does not fill up said predetermined amount, causing said data processor unit to defer sending said write data from said data processor unit to said storage controller; and at the time that following the deferment, the write data reaches said predetermined amount, causing said data processor unit to send said write data of said predetermined amount from said data processor unit to said storage controller.

9. A method of controlling a computer system having (n+1) storage devices, a storage controller which is connected to said (n+1) storage devices, in which write data are divided into units of a predetermined first amount and a parity is generated by n units of write data, and which generates an error correction code in a unit of a predetermined second amount of write data and a data processor unit connected to said storage controller, comprising the steps of:

while write data does not fill up an n multiple of said first amount, causing said data processor unit to defer sending said write data from said data processor unit to said storage controller;

at the time that following the deferment, the write data reaches the n multiple of said first amount, causing said data processor unit to send said write data of the n multiple of said first amount from said data processor unit to said storage controller;

causing said storage controller to generate parity for said write data of the n multiple of said first amount;

causing said storage controller to generate error correction codes for said write data of the n multiple of said first amount and said parity; and causing said storage controller to write said write data of the n multiple of said first amount, the generated parity and the error correction codes to predetermined said (n+1) storage devices.

* * * * *